Patented May 30, 1939

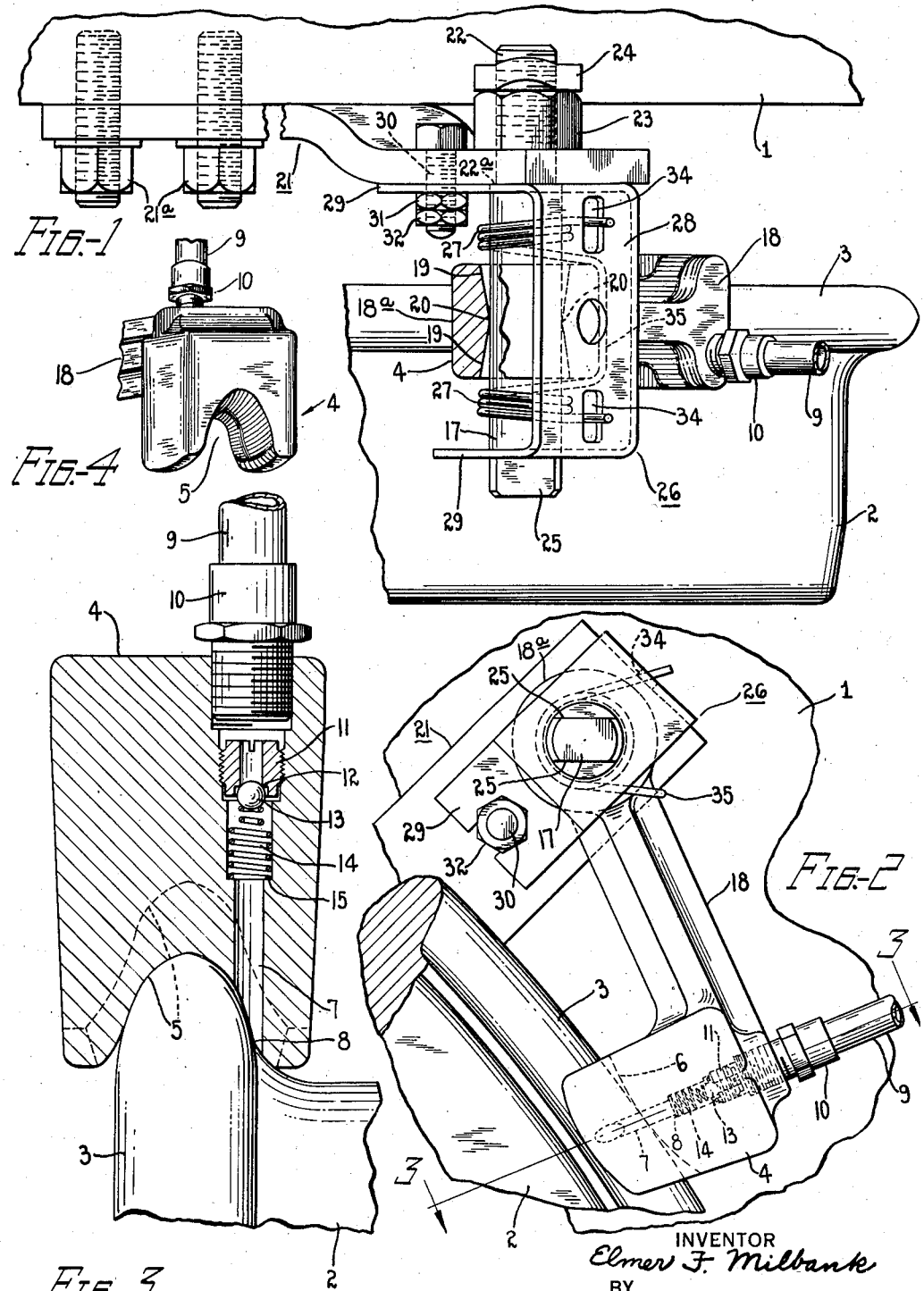

2,160,784

UNITED STATES PATENT OFFICE 2,160,784

LUBRICATING DEVICE

Elmer F. Milbank, Galesburg, Ill., assignor to Detroit Lubricator Company, Detroit, Mich., a corporation of Michigan Application October 8, 1937, Serial No. 168,015

10 Claims. (Cl. 184—3)

My invention relates generally to lubricating devices and more particularly to wheel flange lubricating devices.

One of the objects of my invention is to provide a new and improved wheel flange lubricating device.

Another object of my invention is to provide a wheel flange lubricating apparatus of a character such that lubricant will be delivered to the flange substantially immediately upon starting of the apparatus.

Another object of my invention is to provide a wheel flange lubricating apparatus which will be efficient in lubricating the flange yet one which will be economical in operation.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a top plan view of a portion of a vehicle and my wheel flange lubricating device mounted thereon;

Fig. 2 is a side view shown in elevation of my device mounted on the vehicle;

Fig. 3 is an enlarged view of my device shown in section and taken along the line 3—3 of Fig. 2, and Fig. 4 is a detail view in perspective of a portion of the device.

Referring to the drawing by characters of reference the numeral 1 designates in general a side frame member of a vehicle, such as a locomotive or other vehicle which travels on wheels, and the numeral 2 designates a wheel of the vehicle having the usual flange 3. My lubricating device includes an oil distributor nozzle comprising a head or shoe 4, preferably a solid block of metal such as cast iron, which is substantially rectangular in cross section. The shoe 4 serves to direct lubricant or oil onto the flange 3 and preferably rides the crown and sides of the flange, having a recess or groove 5 open at its ends and underside to receive the wheel flange 3 which thus guides and supports the shoe. The recess 5 preferably conforms generally to the cross sectional form of the flange 3, as shown in Fig. 3, but preferably the wall surface of the groove or recess is rounded and substantially convex, as at 6, Fig. 2, longitudinally of the groove or in the plane of rotation of the wheel to permit rocking movement of the shoe 4 on the wheel both in the plane of the wheel and transversely thereto, thereby reducing friction between the shoe and the flange. Through the shoe 4 there is a passageway 7 for oil with the discharge end, as at 8, of the passageway opening through the wall of the recess 5 and directed to discharge oil against the inner surface of the flange 3, i. e. the surface which contacts the rails and over considerable surface area adjacent the wheel tread. The passageway 7 discharges into the recess 5 on the line of minimum cross sectional area of the recess, or at the throat formed by the substantially convex surface 6 so that the lubricant will not reach the tread. A conduit 9 is connected to the other or inlet end of the passageway 7 by means of a tubular fitting 10 which may be screw threaded into the inlet end of the passageway. The conduit 9 is preferably of the flexible type and communicatively connects the shoe passageway 7 to the outlet of a pump or other supply means (not shown).

A valve seat member 11 which is preferably removable is provided and may be screw threaded or otherwise rigidly secured in the passageway 7. The valve seat member 11 is an open ended, tubular fitting having a downwardly facing port and seat 12. A valve member 13 which may be a ball type valve is disposed in the passageway 7 to control the port 12, and is biased toward closed position preferably by a helical coil spring 14. The spring 14 has one or its upper end in abutment with the ball valve member 13 and the other end of the spring may seat on an upwardly facing, internal shoulder 15 in the passageway 7, the spring being under compression and urging the valve member toward its seat. The spring 14 exerts sufficient force to hold the valve member 13 seated when the pump or other means supplying oil to the shoe 4 is stopped, or when the oil pressure in passageway 7 and on the valve member falls below a predetermined pressure.

The nozzle or shoe 4 is pivotally supported on a fixed shaft or rod bearing member 17 and has an integral arm 18 of cruciform cross section provided with a cylindrical end bearing portion 18ª having an aperture therethrough parallel to the wheel axle and opposite the head or shoe 4 for receiving shaft 17. As shown in Fig. 1, the aperture through the arm portion 18ª tapers or flares outwardly, as at 19, to its opposite ends providing only a small or narrow annular, internal wall portion 20 at the apex or throat of the tapered converging surfaces for bearing on or engagement with the shaft 17. This construction reduces friction between the shoe arm 18 and the shaft 17 and permits lateral rocking movement of the shoe 4, or rectilineal movement in planes transverse to the axis of shaft 17 so that, in cooperation with shoe surface 6, the shoe can follow the movement of the wheel 2 when the wheel moves laterally.

The shaft 17 extends across the wheel flange 3 with its longitudinal axis substantially parallel to the axis of the wheel 2, and preferably the shaft 17 is supported by a bracket or supporting plate member 21 that is rigidly secured by studs or bolts 21ª to the frame side member 1. The shaft 17 may have a reduced threaded end portion 22 to extend through an aperture in the bracket 21 and provide a shoulder 22ª for engaging the bracket, and may have a nut 23 threaded thereon by means of which the shaft may be rigidly secured to the bracket and against rotation. Preferably a lock nut 24 is also threaded onto the shaft portion 22 to lock the nut 23 against movement. In the present instance, an outer end portion of the shaft 17 is flattened, as at 25, to provide opposed flat gripping surfaces for a tool so that the shaft can be held against rotation while the nut 23 is being tightened.

An abutment member or bracket member 26, mounted on and rotatably receiving the shaft 17, holds the spring 27 under tension and the spring yieldably holds the pivoted shoe 4 against the wheel flange 3. The abutment member 26 may be of general U-shape having a base 28 and substantially parallel arms or side members 29 which may be provided with aligning apertures to receive the shaft 17. The abutment member 26 may be rigidly secured to the bracket 21 by a bolt 30 extending through an aperture in the bracket and through an aligning aperture in one of the side members 29, and have a nut 31 and a lock nut 32 threaded thereon. The spring 27 may have opposite end portions wound around the shaft 17, on opposite sides of the shoe arm 18, with the ends of the spring positioned in spaced apertures 34 provided in the base 28 of the abutment member 26. Intermediate its ends, the spring 27 has a bail-like connection portion 35 which straddles and abuts the shoe arm 18. The spring 27 yieldably urges the shoe 4 against the wheel flange 3 and preferably exerts only sufficient force to hold the shoe from disengagement with the flange while the wheel is rotating.

The operation of my wheel flange lubricating device is as follows: In lubricating apparatus of the character herein described, the pump or other supply means is usually operated by the drive mechanism of the vehicle in a manner such that the pump or other supply means operates only when the vehicle is in motion. When the pump is started, the resultant increased pressure in the oil supply line overcomes the spring 14 and moves the valve member 13 away from its seat 12. Oil then flows through passageway 7 in the shoe 4 and discharges from the passageway outlet 8 onto the wheel flange 3 so that friction between the wheel flange and the rail side and resultant wear of these parts is materially reduced. Oil will be supplied to the flange 3 so long as the pump or other supply means operates and creates sufficient pressure to open the valve member 13. When the vehicle comes to rest and the pump or other supply means is stopped, the valve member 13 will soon thereafter be seated by the spring 14 to prevent further supply of oil to the flange 3. This not only saves oil, which would otherwise drain out of the feed line 9, but also retains the oil in the line above the valve member 13 so that when the vehicle is again started, oil will be supplied substantially immediately to the wheel flange 3. When the vehicle is in motion the frame of the vehicle will at times have vertical movement relative to the wheel, and when this occurs the spring 27 will yield and the shoe 4 will pivot correspondingly about shaft 17, but the spring 27 will always hold the shoe 4 in engagement with the wheel flange 3. On lateral or side movement, due to sway of the vehicle, the shoe 4 will pivot about the longitudinal axis of its shaft 17 and because of the construction of its bearing will align the side portions of the recess 5 with the flange 3, and the shoe will follow such lateral movement of the wheel without "cocking", thereby preventing extreme wear of the side wall portions of the groove 5. The converging-diverging bore of the bearing for arm 18, it is seen, provides a substantially universal mounting for the shoe 4. It will also be noted that the mass of the head or shoe 4, in cooperating with spring 27, serves to maintain the shoe in continual engagement with the flange and not permit the shoe to bounce on the flange. The position of passageway 7 also maintains proper oil feed to the flange as the shoe wears in service.

What I claim and desire to secure by Letters Patent of the United States is:

1. A flange oiler nozzle, comprising a supporting member, a fixed bearing member projecting from said supporting member, an arm having a bearing aperture therethrough and mounted for rectilineal and rotational movement on said bearing member, a shoe carried by said arm and having an open-ended groove extending longitudinally of said arm, said groove having its wall surface contoured to fit and to receive therein the circumferential portion of a wheel flange to be lubricated so that said shoe is rectilineally movable with and by the flange, said shoe having a passageway therethrough opening into said groove for supply of lubricant to the groove surface, resilient means acting on said arm so that said resilient means continuously tends to rotate said arm on said shaft in a direction to engage the wheel flange and to frictionally oppose rectilineal movement of said arm member by the wheel flange, and valve means in said shoe passageway and controlling flow through said passageway and responsive to lubricant pressure in said passageway.

2. A flange oiler nozzle, comprising a supporting plate, a shaft projecting from the plane of said plate, an arm having a bearing aperture therethrough and mounted for rectilineal and rotational movement on said shaft, a shoe carried by said arm and having an open-ended groove extending longitudinally of said arm, said groove having its wall surface contoured to fit and to receive therein the circumferential portion of a wheel flange to be lubricated so that said shoe is rectilineally movable with and by the flange, said shoe having a passageway therethrough opening into said groove for supply of lubricant to the groove surface, a bracket member rotatably receiving said shaft and secured to said supporting plate, and resilient means having one portion bearing against said bracket member and having another portion acting on said arm so that said resilient means continuously tends to rotate said arm on said shaft in a direction to engage the wheel flange and to frictionally oppose rectilineal movement of said arm member by the wheel flange.

3. A flange oiler nozzle, comprising a supporting plate member for clamping engagement with a vehicle frame, a supporting shaft rigidly secured to and projecting transverse to the plane of said plate member, a U-shaped bracket member having a base portion overlying said shaft and having in its arms aligned apertures rotatably receiving said shaft, said base portion having spaced apertures, an arm member journaled on said shaft between said arms, a spring coiled about said shaft on opposite sides of said arm member and having a bail portion engaging said arm member, said spring having its ends anchored in said bracket member apertures, and a head portion on said arm member having a groove therein contoured to receive a wheel flange, said head portion having a passageway therethrough opening into said groove for supplying lubricant to a wheel flange.

4. A flange oiler nozzle, comprising a supporting plate member for clamping engagement with a vehicle frame, a supporting shaft rigidly secured to and projecting transverse to the plane of said plate member, a U-shaped bracket member having a base portion overlying said shaft and having in its arms aligned apertures rotatably receiving said shaft, said base portion having spaced apertures, an arm member journaled on said shaft between said arms, a spring coiled about said shaft on opposite sides of said arm member and having a bail portion engaging said arm member, said spring having its ends anchored in said bracket member apertures, a head portion on said arm member having a groove therein contoured to receive a wheel flange, said head portion having a passageway therethrough opening into said groove for supplying lubricant to a wheel flange, and a spring-pressed valve member in said passageway and opposing flow of lubricant into said groove.

5. In a lubricating apparatus for a flanged wheel, a supporting member, an arm member having at one end thereof a converging-diverging aperture therethrough, a substantially cylindrical bearing member secured to said supporting member and having the longitudinal axis thereof parallel to the axis of wheel rotation, said aperture receiving said bearing member, a flange follower member secured to the other end of said arm member, and means resiliently urging said follower member in a direction against a wheel flange and operable to frictionally oppose movement of said arm member along the axis of said bearing member.

6. A flange oiler nozzle for cooperation with a wheel flange comprising a supporting member having a cylindrical bearing portion parallel with the wheel axle, an arm member journaled at one end on said portion for rotary and longitudinal movement, an oiler shoe carried on the other end of said arm member and adapted to cooperate with the wheel flange, means urging said arm in a rotational direction and toward the wheel flange and operable to frictionally hold said arm member against movement thereof longitudinally of said portion.

7. A flange oiler nozzle for cooperation with a wheel flange comprising an arm member supported for movement toward and from the wheel flange in planes normal to the axis of wheel rotation and also for rectilineal movement parallel to the wheel axis, means on said arm member for supplying lubricant to the wheel flange, and means acting to urge said arm member toward the wheel so that said first-named means will be held in cooperative relation to the wheel flange and to frictionally oppose rectilineal movement of said arm member.

8. A flange oiler nozzle for cooperation with a wheel flange comprising an arm member supported for movement toward and away from the wheel flange in planes normal to the axis of wheel rotation and also for rectilineal movement parallel to the wheel axis, means on said arm member for supplying lubricant to the wheel flange, means acting to urge said arm member toward the wheel so that said first-named means will be held in cooperative relation to the wheel flange and to frictionally hold said arm member against undesired rectilineal movement, and means to limit said rectilineal movement so that said acting means is always operative to urge said arm member toward cooperative relationship with the wheel flange.

9. A flange oiler nozzle for cooperation with a wheel flange comprising an arm member supported for movement toward and from the wheel flange in planes normal to the axis of wheel rotation and also for rectilineal movement parallel to the wheel axis, means acting to urge said arm member toward the wheel, and means on said arm member and having side portions substantially fitting and extending on either side of the wheel flange and operable to direct a lubricant against said flange, said portions being operable to move said arm member in said rectilineal movement so that said second-named means can be held in cooperative relation to the wheel flange.

10. A flange oiler nozzle for cooperation with a wheel flange comprising an arm member supported for movement toward and from the wheel flange in planes normal to the axis of wheel rotation and also for rectilineal movement parallel to the wheel axis, means acting to urge said arm member toward the wheel, means on said arm member and having side portions substantially fitting and extending on either side of the wheel flange and operable to direct a lubricant against the wheel flange, said portions being operable to move said arm member in said rectilineal movement so that said second-named means can be held in cooperative relation to the wheel flange, and valve means in said second-named means and operable to shut off the flow of lubricant to the the wheel flange below a predetermined lubricant pressure.

ELMER F. MILBANK.